United States Patent [19]

Andrizzi

[11] Patent Number: 4,476,379
[45] Date of Patent: Oct. 9, 1984

[54] EASILY CLEANED AND SERVICED WAFFLE IRON

[75] Inventor: Sheldon Andrizzi, Valencia, Calif.

[73] Assignee: Belle Gem Waffle Co., Van Nuys, Calif.

[21] Appl. No.: 368,386

[22] Filed: Apr. 14, 1982

[51] Int. Cl.³ .............................................. H05B 3/06
[52] U.S. Cl. ........................................ 219/524; 99/372;
99/389; 219/447; 219/525; 219/386; D7/352
[58] Field of Search ............... 219/385, 386, 447, 449,
219/524, 525, 218, 432, 433; 99/372, 331, 377,
389, 390, 391, 392, 393, 397, 422; D7/87, 88, 89;
307/147; 339/119 R, 121 R, 122 R; 312/223

[56] References Cited

U.S. PATENT DOCUMENTS

| D. 100,195 | 2/1936 | Bellamy | D7/89 |
|---|---|---|---|
| D. 134,457 | 2/1942 | Raiser | D7/89 |
| 194,894 | 9/1877 | Daly | 99/377 |
| D. 253,217 | 10/1979 | Marsoobian | D7/88 |
| 1,989,224 | 1/1935 | Beltram | 219/432 X |
| 2,066,507 | 2/1936 | Yost | 99/376 |
| 2,145,107 | 1/1939 | Benander | 219/432 |
| 2,644,880 | 7/1953 | Valentini et al. | 219/525 |
| 2,798,172 | 7/1957 | Jones | 307/147 |
| 2,866,956 | 12/1958 | Miller et al. | 339/122 R X |
| 3,034,420 | 5/1962 | Wenger | 99/392 |
| 3,535,638 | 10/1970 | Michelin | 339/119 R X |
| 3,608,988 | 9/1971 | Amberg | 219/433 X |
| 3,814,900 | 6/1974 | Frey et al. | 219/447 X |
| 3,848,110 | 11/1974 | Giguere et al. | 219/525 |
| 3,852,569 | 12/1974 | Potvin | 219/525 |
| 4,036,401 | 7/1977 | Nachtigall, Jr. | 219/433 X |
| 4,075,940 | 2/1978 | Carbon | 99/377 |

FOREIGN PATENT DOCUMENTS

| 2225926 | 12/1973 | Fed. Rep. of Germany | 219/524 |
|---|---|---|---|
| 996052 | 12/1951 | France | 99/372 |
| 996722 | 12/1951 | France | 99/377 |
| 1403820 | 5/1965 | France | 219/432 |
| 81241 | 1/1953 | Norway | 219/524 |
| 219811 | 8/1924 | United Kingdom | 219/524 |

Primary Examiner—Volodymyr Y. Mayewsky
Attorney, Agent, or Firm—Poms, Smith, Lande & Rose

[57] ABSTRACT

An easily cleaned and serviced belgian style waffle iron has a cast aluminum base provided with a hollow interior opening downwardly between support legs of the base, an electrical power source component including a housing which is removably secured within the base cavity and includes a pair of electrical conduit plug receiving receptacles, a power line for connection to a source of electrical power, electrical conduit means for electrically connecting the receptacles to the power line and fasteners for holding the housing in the base cavity, a pair of waffle grid providing members are pivotally mounted on the base by a support shaft extending between spaced journal blocks which in turn are removably mounted to the waffle iron base in such a manner to allow easy removal of the blocks, shaft and grid providing members for cleaning or servicing thereof and a pair of detachable thermostat-electrical conduit members are provided to supply electrical power from the electrical power source component to heating elements in the grid providing members, the thermostat-electrical conduit means being disconnectable at both ends where they engage the members and power source component whereby the waffle iron construction is in components which are each individually and collectively separable for cleaning, servicing or replacement.

9 Claims, 8 Drawing Figures

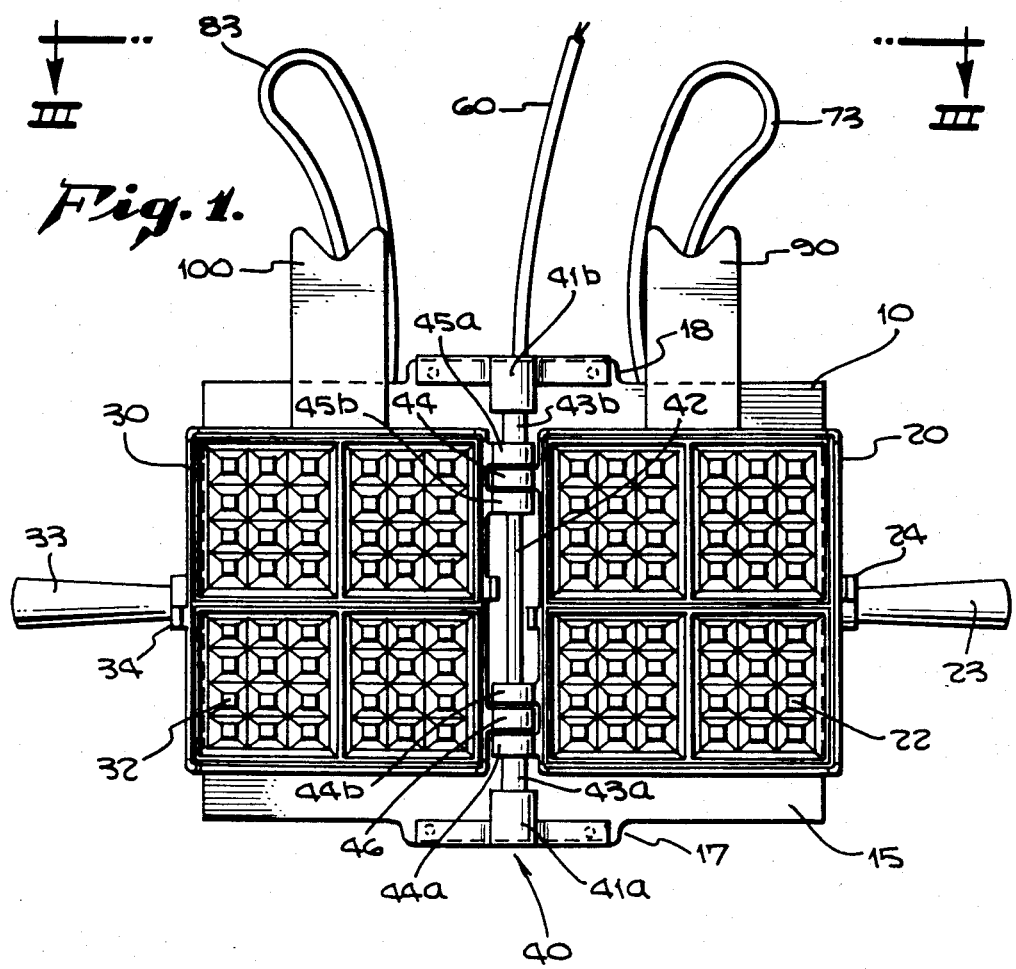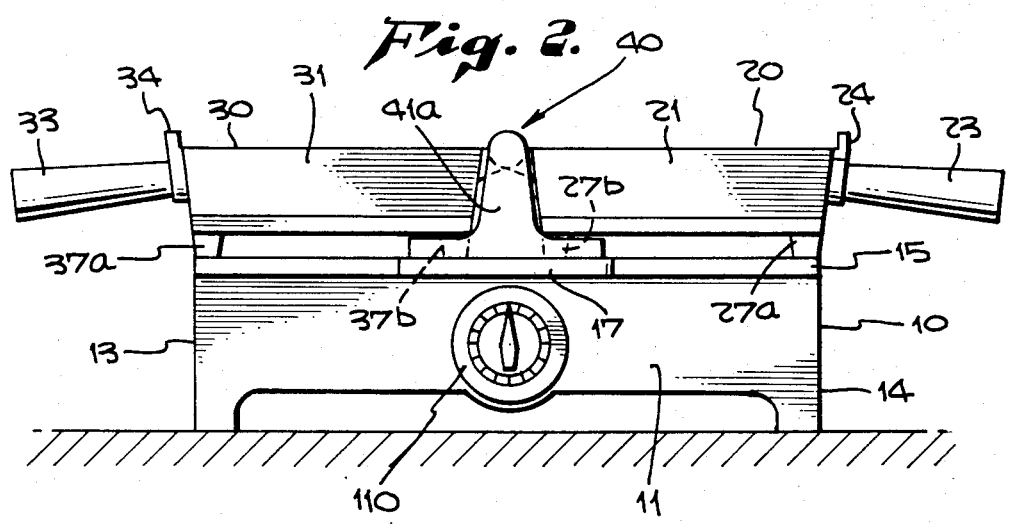

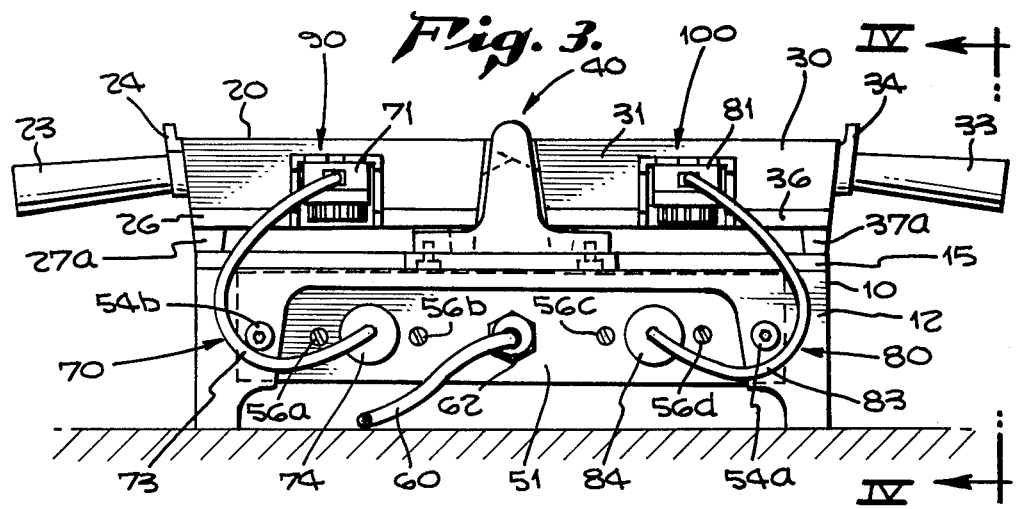
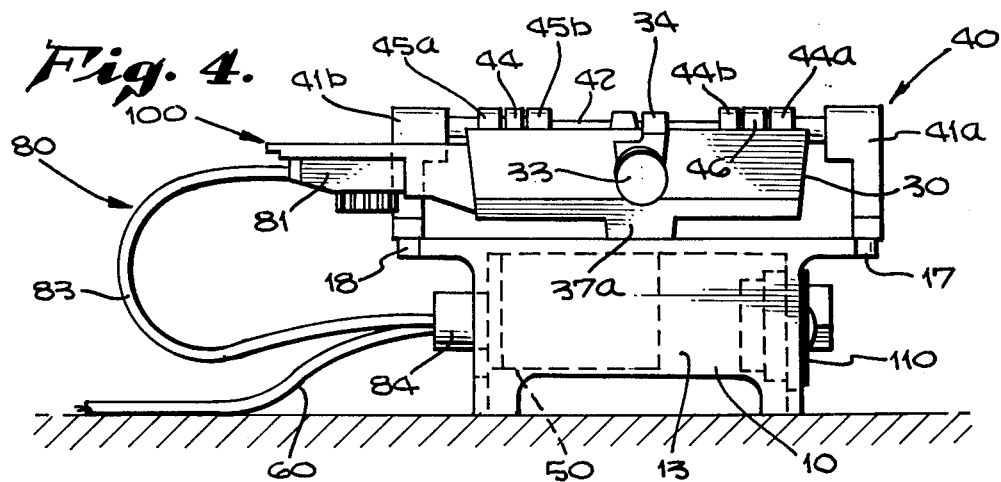
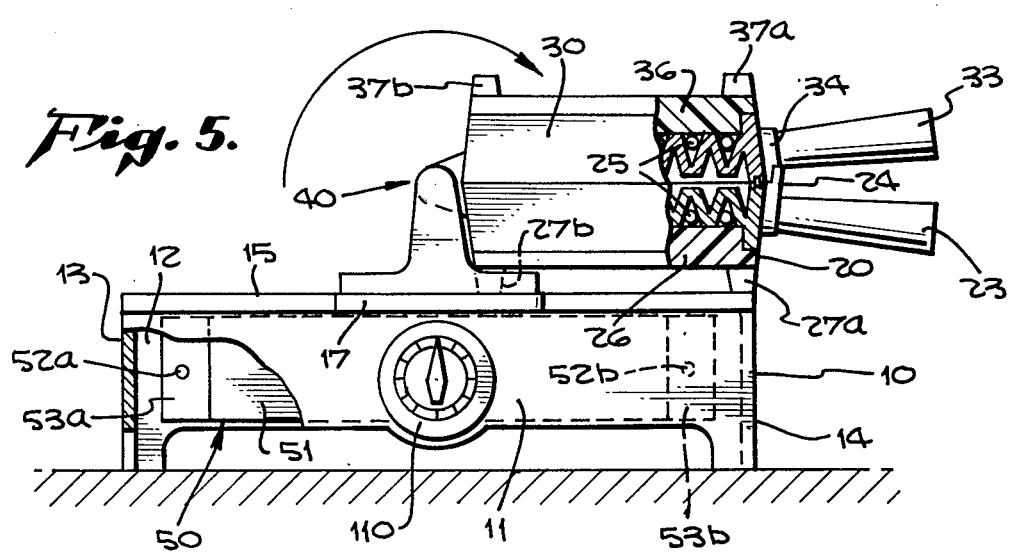

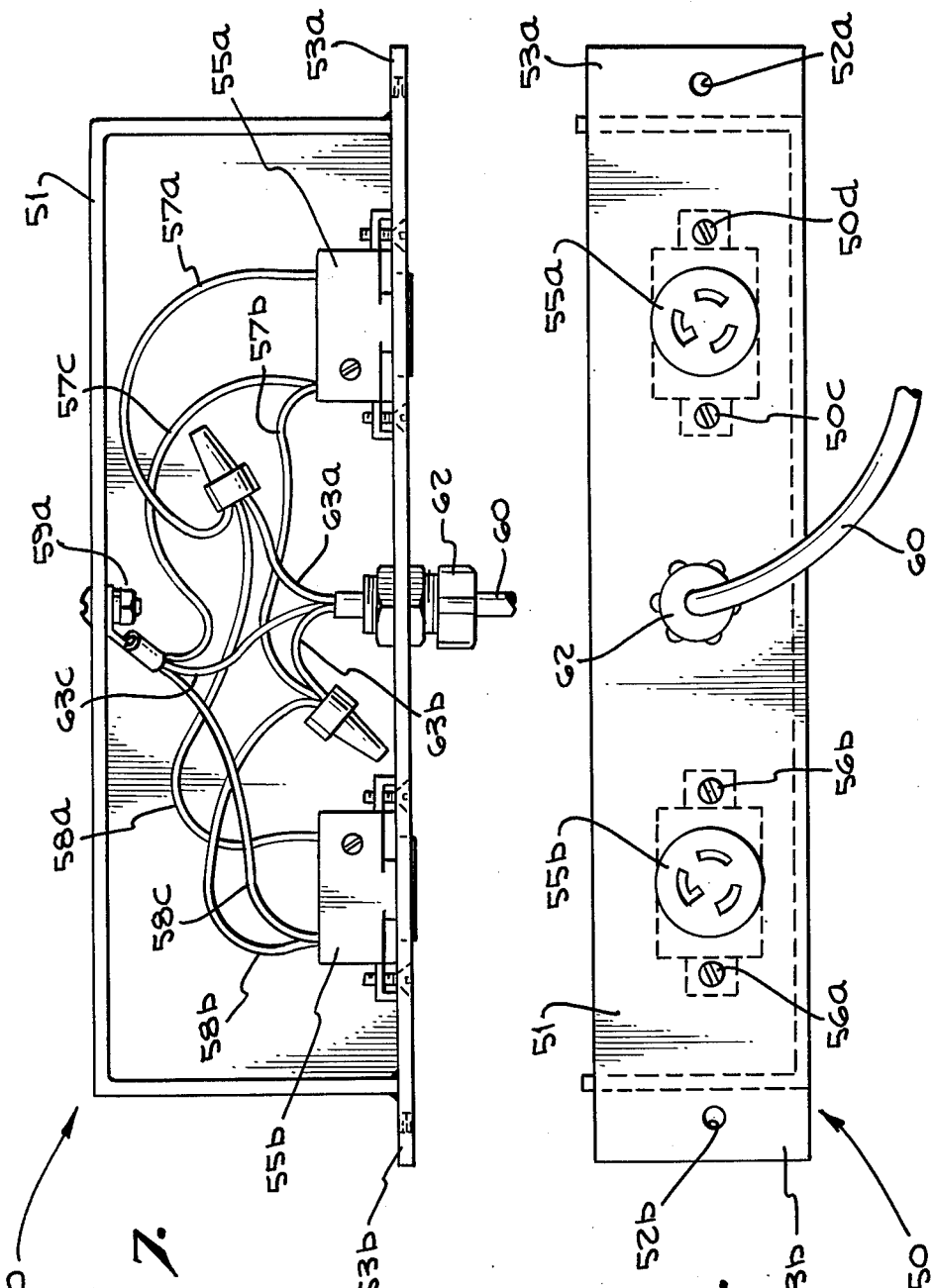

EASILY CLEANED AND SERVICED WAFFLE IRON

BACKGROUND OF THE INVENTION:

The present inventin relates in general to waffle irons and more specifically to waffle irons employed in baking belgian style waffles.

A popular form of waffle commonly referred to as a belgian style waffle is a fairly thick waffle made from light batter in such a manner that fairly deep rectangular indentations of one-half or more inches deep are provided on each surface of the waffle to facilitate the retention of dessert type toppings, fruits and syrups thereon. In order to make such thick waffles of light weight batter it is necessary to employ fairly heavy, bulky waffle iron constructions which have typified the construction of belgian waffle irons. Such irons have generally be made of cast iron and originally were gas fired or heated over coal. The thick heavy cast iron construction of the irons facilitated maintenance of heat and heat transfer throughout the iron to the waffle batter maintained between mating iron members or plates with irons being periodically turned over during the baking process. Waffle iron apparatus which have facilitated such turning of the waffle iron parts or plates have been made in a manner to insure the continued maintenance of the heavy, cast iron parts of the iron in assembled operable relation. Concern has been given heretofore with making the sturdy cast iron construction irons for durability, with the ease of cleaning and servicing thereof being generally overlooked. In the more modern day belgian style waffle irons, electrical heating elements have been utilized in the waffle iron members requiring suitable electrical connections to provide electricity to the heat source, the electrical heating elements. Exemplary thereof is the waffle iron of prior Design Patent Des. No. 253,217.

In the waffle iron construction of the apparatus of design patent DES. No. 253,271, a cast aluminum base was utilized with cast aluminum waffle grid providing members permanently mounted in pivotal relationship upon the base. Thermostat controlled electrical connectors engage the electrical heating elements of the grid providing members in a disconnectable manner while the associated electrical conduits were secured in fixed relation to electrical means permanenetly secured within the iron base in a manner generally referred to as "hard" wiring in the electrical field. A similarly connected power line ran from the base to an electrical source such as a conventional wall electrical receptacle. While the thermostat connections to the waffle grid providing members could be easily disconnected, the waffle grid providing members, the electrical connections and the electrical components were not easily removable from the waffle iron base for cleaning or servicing.

It is therefore the primary object of the present invention to disclose and provide an improved belgian style waffle iron apparatus wherein the waffle grid providing members, electrical connections therefore and electrical components associated with the iron base are all easily disconnected via simple manipulations.

It is a further object to provide an improved belgian style waffle iron apparatus as in the foregoing object wherein the major portions of the iron apparatus are provided in subassemblies or components which are individually removably mounted to the totally assembled iron apparatus in such a manner that the subassemblies or components can be individually or collectively removed for ease of cleaning of all of the iron apparatus parts, for servicing of individual parts which may wear out or deteriorate or alternatively to replace an individual subassembly or component without requiring a substantial "down time" for the apparatus which would detract from its suitability for use in commercial operations, such as in restaurant baking of waffles where it would be not only inconvenient, but commercially undesirable to have any extended interruption in the waffle baking operations.

SUMMARY OF THE INVENTION:

Generally stated, the present invention in an easily cleaned and serviced belgian style waffle iron includes the provision of an open bottomed base having a downwardly opening cavity therein into which an electrical power source subassembly or unitary component is removably positioned, such component preferably including one or more electrical conduit plug receiving receptacles, a power line conduit for connection to a source of electrical power, electrical conduit means for electrically connecting the receptacles to the power line and holding means for removably mounting such component in the base cavity. More specifically, the present invention in an easily cleaned and serviced belgian style waffle further includes the provision of means for removably mounting a pair of waffle grid providing members in pivotal relation on the waffle iron base, such means in an exemplary embodiment including the provision of a pair of spaced journal blocks which are individually held by manually operable fastening means to the waffle iron base whereby on removal of the journal blocks, an associated shaft to which the grid providing members are pivotally mounted is freed to release the grid providing members from the base.

As is further contemplated within the present invention, detachable thermostat-electrical conduit means are provided for being selectively connected not only in thermal sensing and electrical power supply relation to heating elements of the grid providing members, but also in a quick connect-disconnect manner to the electrical power source component whereby on cleaning or servicing of the waffle iron, the base, grid providing members, thermostat-electrical conduit means and electrical power source components are each individually and collectively separable from the waffle iron apparatus as a whole.

As is still further contemplated within the present invention, thermal insulating material is provided in plate like form to cover the undersides of the grid providing members in order to reduce the likelihood of an operator touching the heat conductive, normally cast aluminum portions of the members. Guard means, preferably in the form of flanges formed integrally of the thermal insulating plates, are also provided for to reduce the likelihood of waffle batter or cleaning fluids from contacting the thermostat units where they are secured to the grid providing members.

It is believed that a better understanding of the present invention in waffle iron, as well as a realization of additional objects and advantages therefore, will be afforded to those skilled in the art from a consideration of the following detailed description of a preferred exemplary embodiment. Reference will be made to the appended sheets of drawings which will be first described briefly.

BRIEF DESCRIPTION OF THE DRAWINGS:

FIG. 1 is a plan view of a preferred exemplary embodiment of the easily cleaned and serviced waffle iron of the present invention.

FIG. 2 is a front view of the waffle iron of FIG. 1.

FIG. 3 is a rear view of the waffle iron taken along the plane III—III in FIG. 1.

FIG. 4 is a right side view of the exemplary waffle iron taken along the plane IV—IV in FIG. 3.

FIG. 5 is a front view of the exemplary waffle iron as in FIG. 2 showing one of the waffle grid providing members pivoted into overlying relation with the other of said members in a waffle baking position for said members.

FIG. 7 is a top view of the electrical power source component showing the electrical subassembly contained within the component housing which is attached to as a unit to the iron base.

FIG. 8 is a front view of the electrical power source component of FIG. 7.

Figure 6:
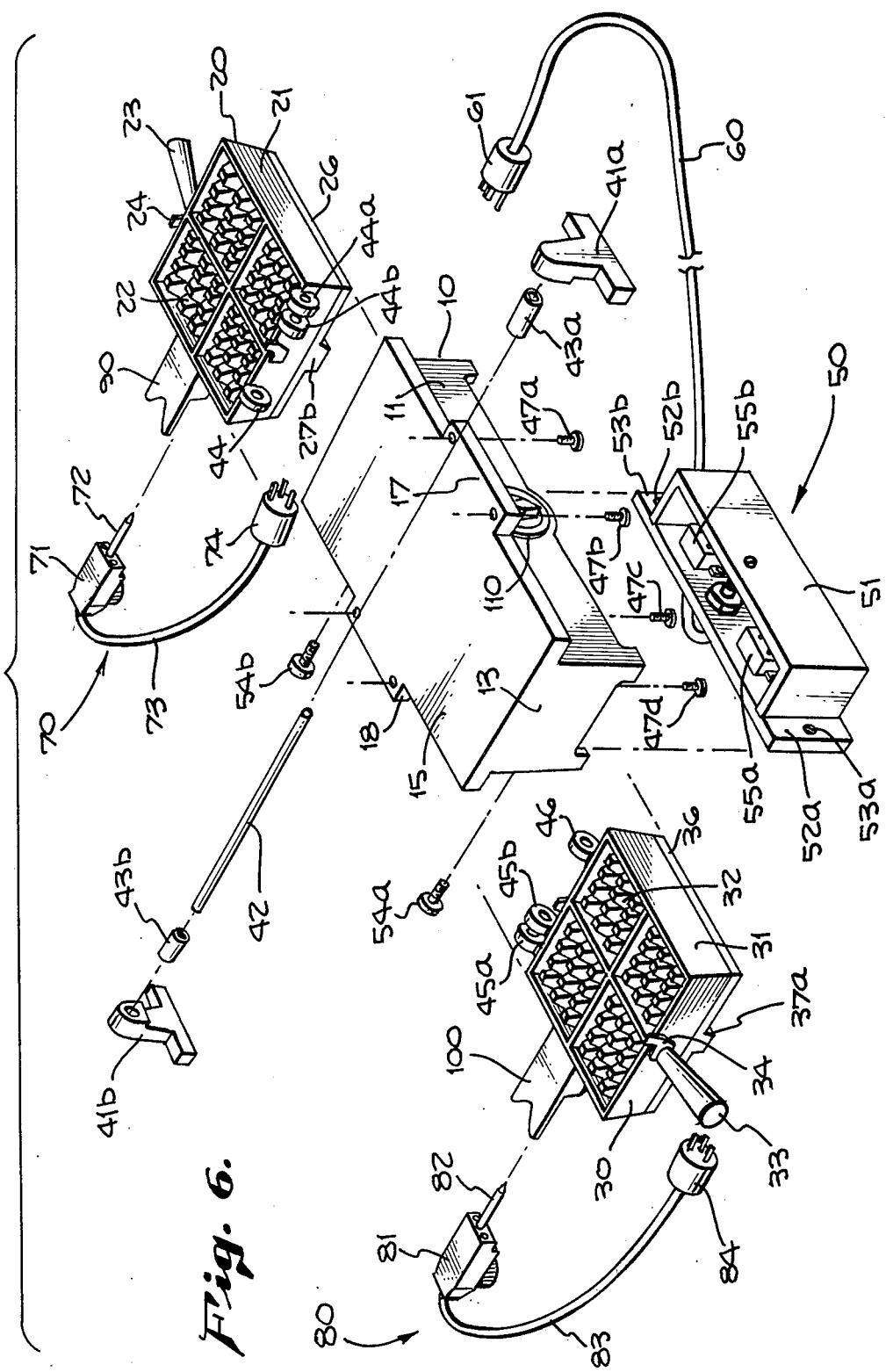
FIG. 6 is an exploded view of the exemplary waffle iron showing the individual components separated from one another for ease of cleaning, servicing or replacement of the components.

DETAILED DESCRIPTION OF A PREFERRED EXEMPLARY EMBODIMENT:

Referring initially to FIG. 6, the preferred exemplary embodiment of easily cleaned and serviced waffle iron, in accordance with the present invention, is made up of a plurality of individual components which are easily separated for cleaning and servicing in accordance with the present invention. As seen in FIG. 6, the exemplary waffle iron includes, generally stated, a base 10, a pair of waffle grid providing members 20 and 30, an electrical power source subassembly or component, indicated generally at 50, and a pair of individually detachable thermostat-electrical conduit means 70 and 80. The waffle grid providing members 20 and 30 are both removably and pivotally mounted to the base by removable mounting means, indicated generally at 40, with thermal insulating material guard flanges 90 and 100 extending laterally outwardly of the members to overlie the thermostatelectrical connection each of the members have with the aforestated conduit means 70 and 80.

Referring now more particularly to FIGS. 1 through 6, the exemplary waffle iron base 10 is made up of a unitary cast aluminum component having a front wall 11, back wall 12, left side wall 13, right side wall 14 and top 15. Base 10 is preferably hollow to provide an internal cavity within the side walls below top 15 which opens downwardly through the open bottom of the base. Top 15 is further provided with a forward journal block mounting front flange 17 and rear flange 18 for the removably mounted journal blocks 41a and 41b discussed hereinafter. As best seen in FIG. 3, back wall 12 of base 10 is provided with a cutout or notch 19 extending over a substantial portion thereof to expose most of the front face of the electrical power source component indicated generally at 50 to facilitate electrical connections thereto as discussed hereinafter.

A pair of waffle grid providing members 20 and 30 are removably mounted, in accordance with the present invention, to base 10 to facilitate their removal for cleaning, service or replacement. The respective members 20 and 30 each comprise a cast aluminum body 21, 31 having a waffle grid face 22, 32, respectively. The waffle iron bodies may be pivoted from the open position of FIG. 3 to the closed position of FIG. 5, by way of example, through the use of handles 23, 33, handle flanges 24 and 34 engaging in an overlapping relation as seen in FIG. 5. Appropriate rod type heating elements 25 and 35 are embedded within each of the cast aluminum bodies 21 and 31 with, as contemplated within the present invention, the provision of thermal insulating plastic material body covers or plates 26 or 36 protecting the users from coming in direct contact with the hot cast aluminum portions of bodies 21 and 31 respectively. Feet 27a and 27b are provided on cover 26 with integral feet 37a and 37b being formed in cover 36 to facilitate positioning of the waffle grid providing members 20 and 30 in open position on base 10 as seen in FIGS. 1 through 4. While the waffle grid providing members 20 and 30 are shown pivoted in FIG. 5 to a position with member 30 overlying member 20, it is contemplated in normal waffle baking operations that both members will be pivoted in the opposite direction to place member 20 in overlying relation to member 30 during a baking operation.

The means for removably mounting the aforedescribed waffle grid providing members 20 and 30 to base 10 in the exemplary embodiment are indicated generally at 40 and include the provision of a pair of journal blocks, including front journal block 41a and rear journal block 41b, shaft 42 and the provision of apertured hinge flanges 43a, 43b and 44 on member 20 and 45a, 45b and 46 on member 30 as best seen in FIG. 6. Hinge flanges 43a and 43b are closely spaced to receive flange 46 therebetween, as are flanges 45a and 45b closely spaced to receive flange 44 therebetween, each of the flanges being apertured as stated to receive shaft 42 therethrough to pivotally mount members 20 and 30 on shaft 42. Spacer sleeves 44a and 44b are provided to center the members 20 and 30 over base 10 when assembled in pivotal relation thereto as seen in FIGS. 1 through 5. As is particularly contemplated within the present invention, shaft 42 is removably received in the journal blocks 41a and 41b which in turn are removably fastened to the top 15 of base 10 by suitable manually operable fasteners 47a, 47b, 47c an 47d. Such fasteners may comprise wing nuts, hexhead nuts or recessed allen wrench style hex headed machine screws turned into suitably tapped vertical bores through mounting flanges 17 and 18 of top 15 of base 10. By removing fasteners 47a-d, the journal blocks 41a and 41b may be easily released from the base to release shaft 42 and the associated waffle grid providing members 20 and 30 from the base.

As is particularly contemplated within the present invention, an electrical power source subassembly or component, indicated generally at 50, is removably mounted as a unit to the open bottomed base 10 to facilitate its removal for cleaning of the base, servicing of the electrical conduits and receptacles provided therein or ease of the replacement if necessary without substantially interrupting continued use of the waffle iron, as is particularly desirable in commercial insulations. In the exemplary embodiment, the electrical power source subassembly includes a housing 51 in the form of a five sided open box of cast aluminum construction which is removably mounted via apertures 52a and 52b in end flanges 53a and 53b respectively. As seen in FIGS. 3 through 6, housing 51 is simply inserted upwardly through the open bottom of base 10 and secured therein through the use of threaded fasteners 54a and 54b which penetrate through bores in the front wall 12 of base 10 to engage in suitably tapped threads of apertures 52a and 52b. Fasteners 54a and 54b may be made in the same form as fasteners 47a–d. Electrical conduit plug receiving receptacles 55a and 55b are provided within housing 51 with their front faces opening outwardly of housing 51 through a front wall thereof as seen in FIG. 8. Suitable fasteners 56a–d are provided for mounting receptacles 55a and 55b to the front wall of the box like housing 51 as seen in FIGS. 3, 7 and 8. Referring specifically to FIG. 7, electrical conduit means are provided within housing 51 which include positive, negative and ground leads 57a–c, respectively, for receptacle 55a and 58a–c, respectively, for receptacle 55b. Ground 59a receives the ground leads internally of the housing 51.

Electrical power is suppled to the exemplary electrical power source component, indicated generally at 50, via a main conduit 60 which is provided with a conventional three prong plug 61. Conduit 60 is preferably securely attached to housing 51 in other than a quick connect-disconnect type coupling like coupling 62. Its positive, negative and ground leads 63a–c are connected internally of the housing 51 to the respective leads of the internal electrical conduit means as seen in FIG. 7. The exemplary electrical power source component, indicated generally at 50, therefore is a unitary, removable component which communicates with a power source through plug 61 to, when assembled to base 10, provided receptacles 55a and 55b opening through recess 19 in the rear wall 12 of base 10 for quick connect-disconnect electrical connections.

Detachable thermostat-electrical conduit means are provided, as particularly contemplated within the present invention, in a manner to provide for complete quick removal from the power source component, indicated generally at 50, as well as the individual waffle grid providing members 20 and 30. Such thermostat-electrical conduit means in the exemplary embodiment are indicated generally at 70 and 80 and include the provision of otherwise conventional electrical thermostat units 71, 81, which have thermal probs 72 and 82 respectively, to engage in conventional manner with the electrical rod type heating elements 25 and 35 of members 20 and 30 respectively. The thermostat control units are connected to electrical conduits 73 and 83, respectively, which in accordance with the present invention are provided with quick connect-disconnect type three prong electrical plugs 74 and 84, respectively, at their opposite ends so that a completely removable, easily disconnected electrical connection be made with the power source component indicated generally at 50. Each of the electrical plugs 74 and 84 may be provided with bayonet type prongs with receptacles 55a and 55b having mating slots wherein the plugs are inserted and then turned into a locking connection until manually turned in the opposite direction for release. A quick connect-disconnect electrical connection is thus afforded between the power source component, indicated generally at 50, and the thermostat-electrical conduit means 70 and 80.

As is further contemplated within the present invention, guard flanges 90 and 100 are provided on waffle grid providing members 20 and 30, respectively, to protect the thermostat units 71 and 81 from waffle batter of cleaning solutions applied to the open members 20 and 30 as seen in FIG. 1. Preferably, guard flanges 90 and 100 are formed integrally of the plastic thermal insulating material of the body covers or plates 26 and 36 to be automatically located in guard positions on assembly of the plates to the cast aluminum bodies 21 and 31, respectively. Machine screw fasteners may be employed for mounting plates 26 and 31 in removable fashion to facilitate cleaning and servicing of the members 20 and 30.

A conventional timer 110 is shown mounted to base 10 in FIGS. 2 and 4–6 in conventional manner, however, by virtue of the opened bottom construction for base 10, in accordance with present invention, easy access is provided to the timer works positioned within the base cavity, as seen in FIG. 4, so that the timer can also be easily reached for servicing or replacement.

Having thus described a preferred exemplary embodiment of an easily cleaned and serviced waffle iron in accordance with the present invention, it should be now apparent to those skilled in the art that the within invention attains the various objects and advantages hereinbefore stated and that various other embodiments, modifications, adaptations and equivalents may be made within the scope of the present invention which is defined by the following claims.

I claim:

1. An easily cleaned and serviced belgian style waffle iron comprising:
    an open bottom base having a cavity accessible through its open bottom;
    an electrical power source subassembly including a pair of electrically insulated electrical conduit plug receiving receptacles, an electrically insulated power line conduit and associated plug for connection to an electrically insulated electrical supply receptacle, electrically insulated electrical conduit means for electrically connecting said plug receiving receptacles to said power line conduit and holding means for removably mounting said receptacles, power line conduit and electrical conduit means in an unitary subassembly in said base cavity;
    a pair of waffle grid providing members each having a waffle grid of heat conductive material and means for removably mounting said members to said base for pivotal movement into and out of a waffle baking position; and
    detachable electrically insulated thermostat-electrical conduit means for selective engagement and disengagement with both a plug receiving receptacle of said power source subassembly and a heating element of at least one of said waffle grid providing members to selectively place said heating element in thermally controlled electrical communication with said power line conduit via said electrical power source subassembly whereby:
    each of said electrical power source subassembly, waffle grid providing members and thermostat-electrical conduit means are individually and collectively removable from said base for cleaning and for ease of servicing or replacement.

2. An easily cleaned and serviced belgian style waffle iron as in claim 1 wherein said holding means of said electrical power source subassembly comprisings:
    a housing having a side wall to which said electrical conduit plug receiving receptacles are mounted with the receptacles opening outwardly through apertures in said side wall, a cavity containing said receptacles and electrical conduit means, a fitting mounting said power line conduit fixedly to said housing and removable fastening means for mounting said housing to said base within said base cavity.

3. An easily cleaned and serviced belgian style waffle iron as in claim 1 wherein said means for removably mounting said waffle grid providing members to said base comprises:
a pair of journal blocks, a member mounting shaft, and fastener means for removably holding said journal blocks in spaced relation on said base with said shaft extending between and being mounted by said journal blocks, said grid providing members each having apertured hinge providing flanges by which said members are pivotally mounted on said shaft, whereby selected removal of said journal blocks from said base releases said shaft and said grid providing members for removal of said grid members from said base.

4. In a waffle iron apparatus having a pair of waffle grid providing members of heat conductive material and having internal heating elements to bake waffle batter positioned between said members, the improvement comprising the provision of:
a base having a normally outwardly open internal cavity;
an electrical component subassembly including a housing having at least one electrically insulated electrical conduit plug receiving receptacle opening through a side wall thereof, an electrically insulated power line conduit secured to said housing for connection to an electrically insulated electrical power source, electrically insulated electrical conduit means within said housing for electrically connecting said receptacle to said power line and fastener means for removably mounting said housing within said base cavity; and
detachable electrically insulated thermostat-electrical conduit means for selective engagement and disengagement with both said plug receiving receptacle and a heating element of at least one of said waffle grid providing members to selectively place said heating element in thermally controlled electrical communication with said power line conduit whereby:
each of said electrical component subassembly and thermostatelectrical conduit means are individually and collectively removable from said base and from each other for cleaning and for ease of servicing or replacement.

5. The improvement in waffle iron of claim 4 wherein: means are provided for removably mounting said waffle grid providing members to said base with at least one of said members being movable relative to the other of said members.

6. The improvement in waffle iron of claim 5 wherein said means for removably mounting said members to said base comprising:
a pair of journal blocks removably fastened to said base with a member mounting shaft extending therebetween whereby on removal of said journal blocks, said shaft and associated members are released from said base.

7. An easily cleaned, componentized waffle iron including a base and further comprising:
an electrical power source component and means for removably mounting said component to said base, wherein said base comprising a hollow structure having a downwardly opening cavity for receiving said electrical power source component therein and wherein said electrical power source component comprising at least one electrically insulated electric plug receiving receptacle, a box with a plurality of side walls and at least one said receptacle opening through a side wall thereof, an electrically insulated main power line conduit connected to said box and electrically insulated electrical conduit means within said housing communicating between at least one said receptacle and said power line conduit;
at least one waffle grid providing member including a grid of heat conduitive material and being removably mounted to said base and having an electrically operated and electrically insulated heating element therein; and
detachable electrically insulated electrical conduit means for releasable connection to each of said heating element of said member and to said component, whereby:
each of said electrical power source component, and electrical conduit means are individually and collectively removable from said base and from each other for cleaning and for ease of servicing or replacement.

8. A waffle iron of claim 7 wherein means are provided for removably mounting said waffle grid providing member in pivotal relation to said base including a pair of journal blocks removably fastened to said base with a grid providing member mounting shaft extending between said blocks.

9. An easily cleaned and serviced belgian style waffle iron comprising:
an open bottom base having a cavity accessible through its open bottom;
an electrical power source subassembly including an pair of electrically insulated electrical conduit plug receiving receptacles, an electrically insulated power line conduit and associated plug for connection to an electrically insulated electrical supply receptacle, electrically insulated electrical conduit means for electrically connecting said plug receiving receptacles to said power line conduit and holding means for removably mounting said receptacles, power line conduit and electrical conduit means in an unitary subassembly in said base cavity;
a pair of waffle grid providing members each having a waffle grid of heat conductive material and means for removably mounting said members to said base for pivotal movement into and out of a waffle baking position;
detachable electrically insulated thermostat-electrical conduit means for selective engagement and disengagement with both a plug receiving receptacle of said power source subassembly and a heating element of at least one of said waffle grid providing members to selectively place said heating element in thermally controlled electrical communication with said power line conduit via said electrical power source subassembly whereby each of said electrical power source subassembly, waffle grid providing members and thermostatelectrical conduit means are individually and collectively removable from said base for cleaning and for ease of servicing or replacement; and thermal insulating plate means covering the underside of each of said waffle grid providing members wherein said thermal insulating plate means are further provided with integrally formed guard flanges extending outwardly of the associated waffle grid providing members to overlie portions of said electrical conduit means where connected to the associated member.

* * * * *